(12) United States Patent
Earnest

(10) Patent No.: US 7,416,227 B1
(45) Date of Patent: Aug. 26, 2008

(54) CONDUIT REPAIR APPARATUS AND METHOD

(76) Inventor: William C. Earnest, 3233 Sandhill Dr., Fayetteville, NC (US) 28306

( * ) Notice: Subject to any disclaimer, the term of this patent is extended or adjusted under 35 U.S.C. 154(b) by 0 days.

(21) Appl. No.: 10/952,190

(22) Filed: Sep. 28, 2004

Related U.S. Application Data

(63) Continuation of application No. 10/280,687, filed on Oct. 25, 2002, now abandoned.

(51) Int. Cl.
*F16L 21/06* (2006.01)
*F16L 9/00* (2006.01)
*F16L 55/16* (2006.01)
*F16L 55/18* (2006.01)

(52) U.S. Cl. .................. 285/419; 285/373; 138/162; 138/166

(58) Field of Classification Search ............ 285/15, 285/16, 31, 373, 419; 138/99, 162, 166
See application file for complete search history.

(56) References Cited

U.S. PATENT DOCUMENTS

| 1,995,716 | A | 3/1935 | Millsom |
| 3,563,276 | A | 2/1971 | High et al. |
| 3,757,031 | A | 9/1973 | Izraeli |
| 3,771,820 | A | 11/1973 | Hoss et al. |
| 3,865,410 | A | 2/1975 | Chen |
| 4,103,943 | A | 8/1978 | Curtin |
| 4,260,181 | A | 4/1981 | Curtin |
| 4,429,907 | A | 2/1984 | Timmons |
| 4,465,309 | A | 8/1984 | Nimke et al. |
| 4,629,216 | A | 12/1986 | Pedersen |
| 5,007,666 | A | 4/1991 | Kyfes |
| 5,022,685 | A | 6/1991 | Stiskin et al. |
| 5,462,312 | A | 10/1995 | Carpenter et al. |
| 5,823,581 | A | 10/1998 | Coppolo |
| 5,901,753 | A | 5/1999 | Ziu |
| 6,247,500 | B1 | 6/2001 | McMahon |
| 6,390,139 | B1 | 5/2002 | Kang et al. |
| 6,431,216 | B1 | 8/2002 | Briscoe |
| 6,494,232 | B2 | 12/2002 | Waddleton |
| 6,550,819 | B2 | 4/2003 | DeSanto, Sr. |
| 6,619,697 | B2 | 9/2003 | Griffioen et al. |
| 6,758,499 | B1 * | 7/2004 | Belew et al. ............... 285/15 |
| 2005/0109415 | A1 * | 5/2005 | Snyder ................... 138/162 |

* cited by examiner

*Primary Examiner*—James M Hewitt

(57) ABSTRACT

Repair apparatus in the form of a tubular member composed of a semi-tubular lower section and a semi-tubular upper section which engage along the side edges. The semi-tubular sections have flared ends which surround the ends of a discontinuous conduit which have been severed to remove a damaged conduit section. The method of repairing a damaged conduit includes the step of applying an adhesive along the flared ends and edges of the semi-tubular sections for placement on the ends of the discontinuous conduit to form a tight, water-proof seal to encase electrical wires.

2 Claims, 9 Drawing Sheets

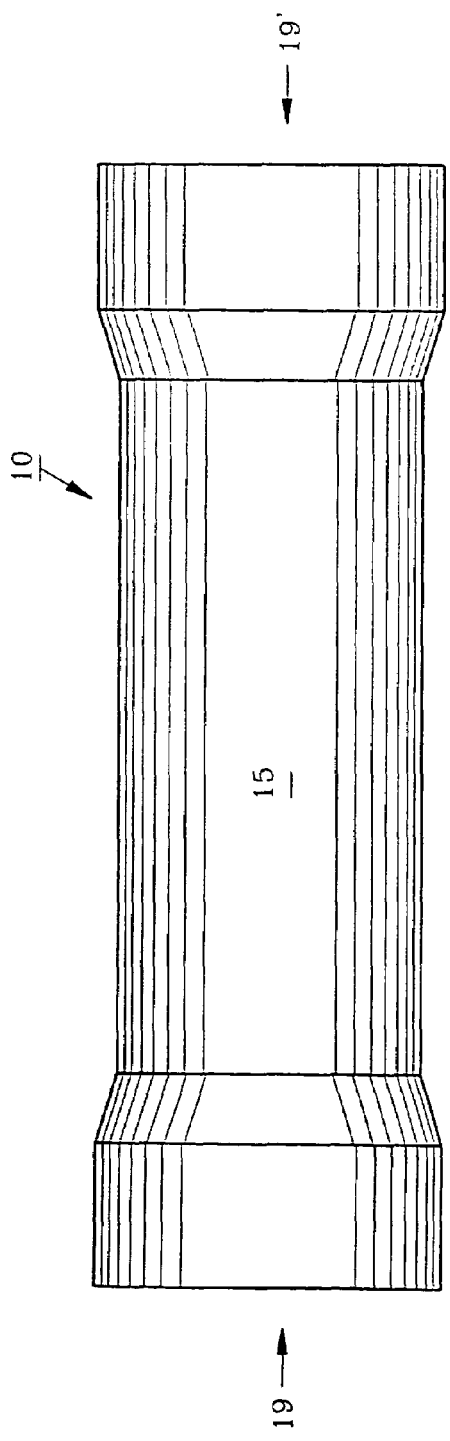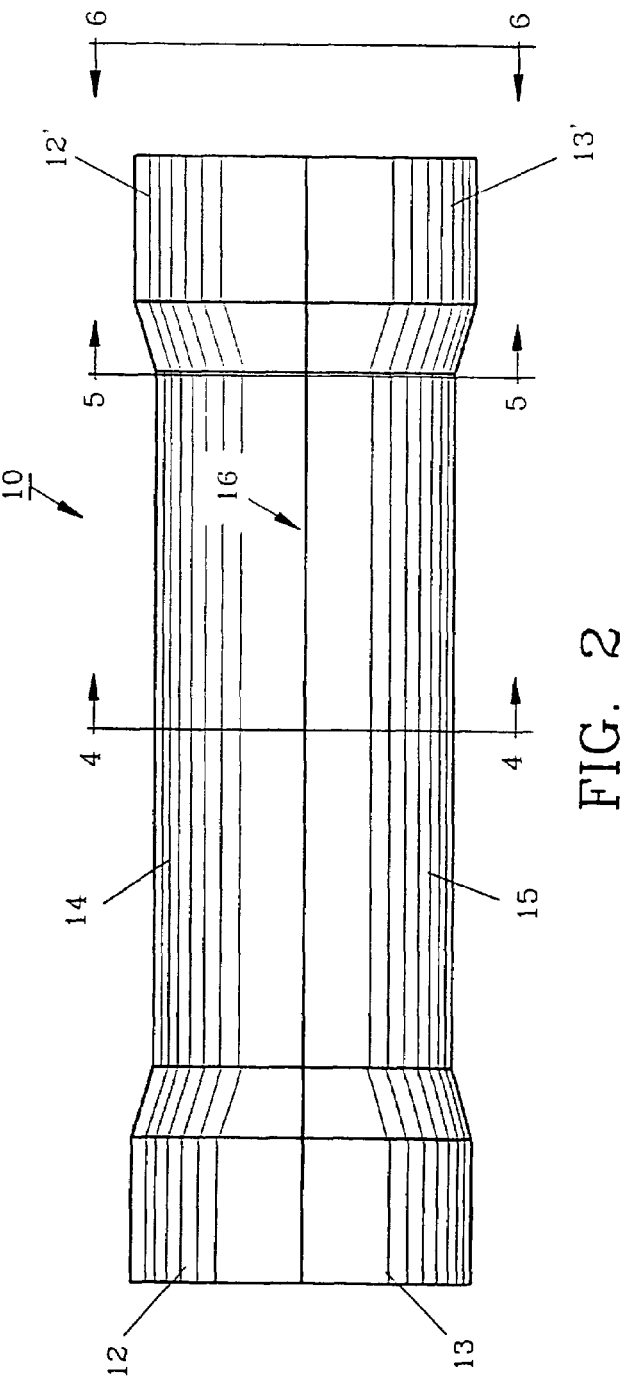

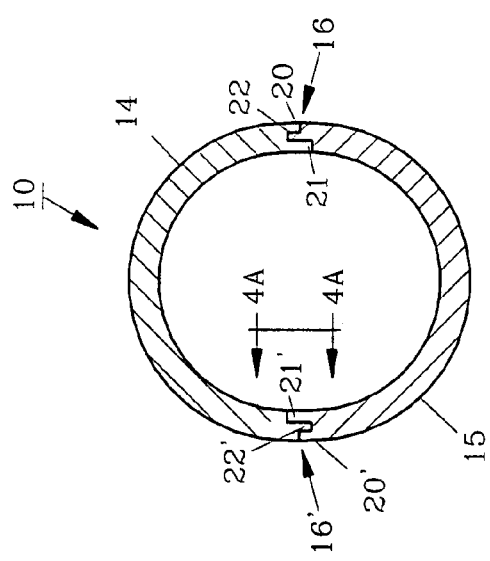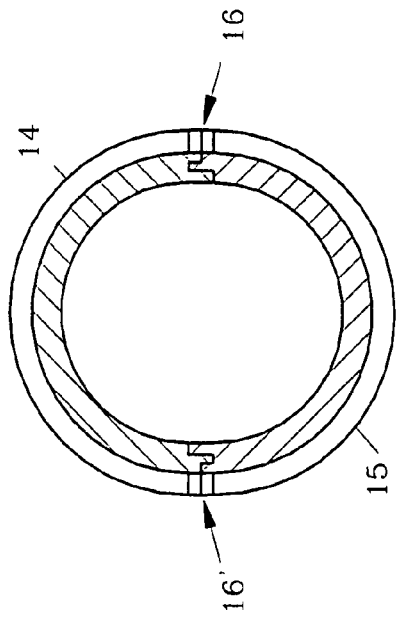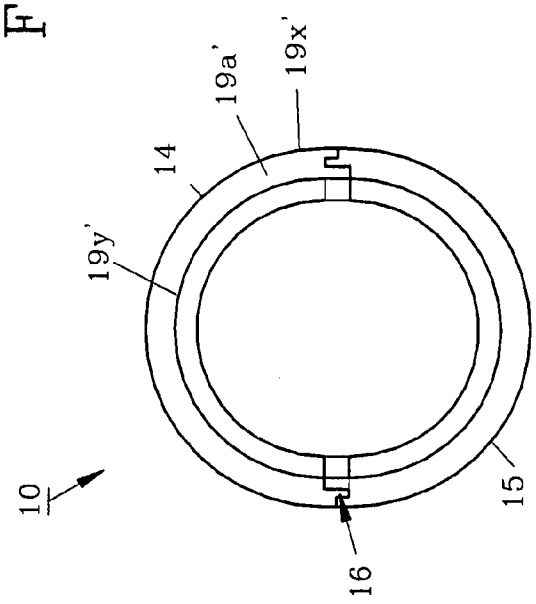

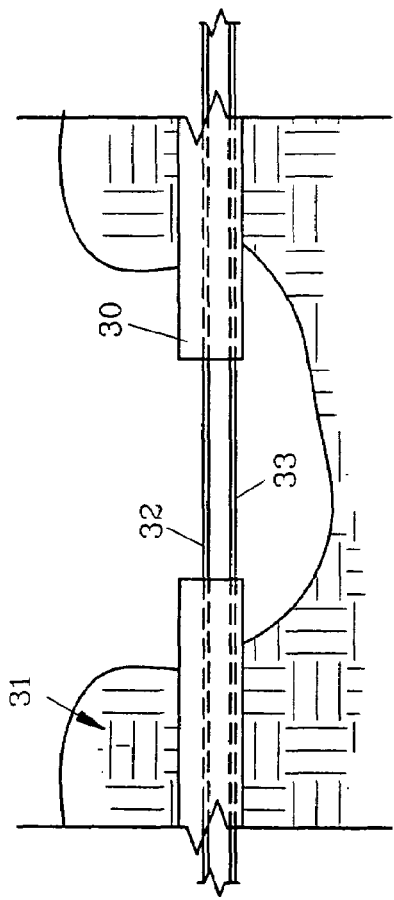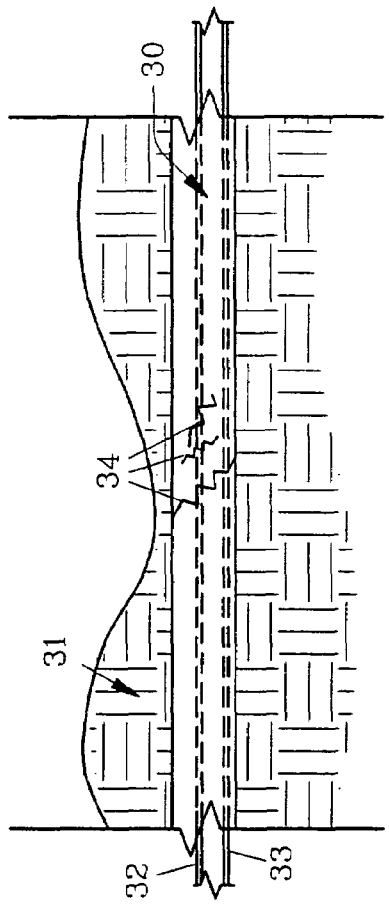
FIG. 9
FIG. 8 (Prior Art)

CONDUIT REPAIR APPARATUS AND METHOD

This is a continuation of and claims benefits under 35 U.S.C. 120 of application Ser. No. 10/280,687 filed 25 Oct. 2002, now abandoned.

FIELD OF THE INVENTION

The invention herein pertains to repairing conduit such as underground conduit containing electrical wires and particularly pertains to the use of plastic semi-tubular members which engage the ends of discontinuous conduits to enclose exposed electrical wires.

DESCRIPTION OF THE PRIOR ART AND OBJECTIVES OF THE INVENTION

Houses and other buildings are constructed with underground electrical wires which are protected and encased in metal or plastic conduits. These conduits often extend for long distances underneath the yard and are usually less than a meter below the ground surface. Heavy vehicles, planting, digging and other activities often damage the conduit and electrical wires contained therein. Various devices have been created in the past to assist in repair of underground conduits such as shown in U.S. Pat. Nos. 5,007,666 and 5,462,312. While these devices have been shown to be beneficial under certain circumstances, they are often difficult to manually manipulate and often do not provide a water tight seal. Thus, problems often develop after repairs, such as shorting of the electrical wires, causing the repair site to be relocated and the conduit and/or wires to be repaired again.

Thus, with the problems and disadvantage of current devices and methods for repairing underground conduits, the present invention was conceived and one of its objectives is to provide a quick and easy method for repairing a damaged conduit.

It is still another objective of the present invention to provide repair apparatus which is relatively inexpensive to manufacture and purchase.

It is a further objective of the present invention to provide repair apparatus for a conduit which includes two semi-tubular sections.

It is yet a further objective of the present invention to provide apparatus for repairing a conduit which includes two semi-tubular section forming a joint composed of ridges on one section and a projection on the other section which cooperatively engage.

It is still another objective of the present invention to provide a tubular repair apparatus which includes flared ends for engaging a discontinuous conduit.

Various other objectives and advantages of the present invention will become apparent to those skilled in the art as a more detailed description is set forth below.

SUMMARY OF THE INVENTION

The aforesaid and other objectives are realized by providing repair apparatus in the form of a polymeric member composed of a semi-tubular upper section and a semi-tubular lower section which have opposing longitudinal ridges and projections along the edges which engage to form locking joints on each side. The repair apparatus has flared ends which are sized to surround the conduit and allow the conduit to adhesively and frictionally fit therewithin. The repair apparatus may be linear or angular in shape with the angular shape being for example 90°, 60°, 45° or 30°, depending on the particular conduit to be repaired. Various inside diameters, lengths and types of the repair apparatus can be provided and can be formed from different compositions for repairing underground conduits which may be formed for example from ABS plastic, PVC plastic, aluminum or the like.

The method of use allows damaged underground conduits to be isolated such as by removing the surrounding dirt in the immediate vicinity of the damaged section. Next, the damaged portion of the conduit is cut-away and removed while the electrical or other wires contained therein are fully exposed for repair, as needed. Once the electrical wires are spliced and repaired, a lower semi-tubular section of the repair apparatus is placed underneath the conduit after adhesive is placed inside the flared ends and along the side edges with each flared end engaging a different end of the remaining conduit. Next, an upper section of the repair apparatus is placed on the conduit in opposing relation to the lower section with a suitable commercial adhesive applied inside the flared ends and also along the side edges. The repair apparatus is then pressed together as the adhesive then forms a water tight seal along the sides and inside the flared ends. Next, dirt is replaced and the electrical wires are then buried and secure from environmental exposure.

BRIEF DESCRIPTION OF THE DRAWINGS

FIG. 2 illustrates a side elevational view of the repair apparatus shown in FIG. 1;

FIG. 4 features a cross-sectional view of the repair apparatus shown in FIG. 2 along lines 4-4;

FIG. 5 pictures another cross-sectional view of the repair apparatus shown in FIG. 2 along lines 5-5;

FIG. 6 depicts an end view of the linear repair apparatus shown in FIG. 2 along lines 6-6;

FIG. 7 shows a bottom plan view of the repair apparatus as seen in FIG. 1;

FIG. 8 illustrates a typical underground conduit which has been damaged and contains two electrical wires;

FIG. 9 demonstrates the electrical conduit shown in FIG. 8 but with the damaged section removed therefrom by sawing or other means;

DETAILED DESCRIPTION OF THE PREFERRED EMBODIMENT AND OPERATION OF THE INVENTION

Figure 1:
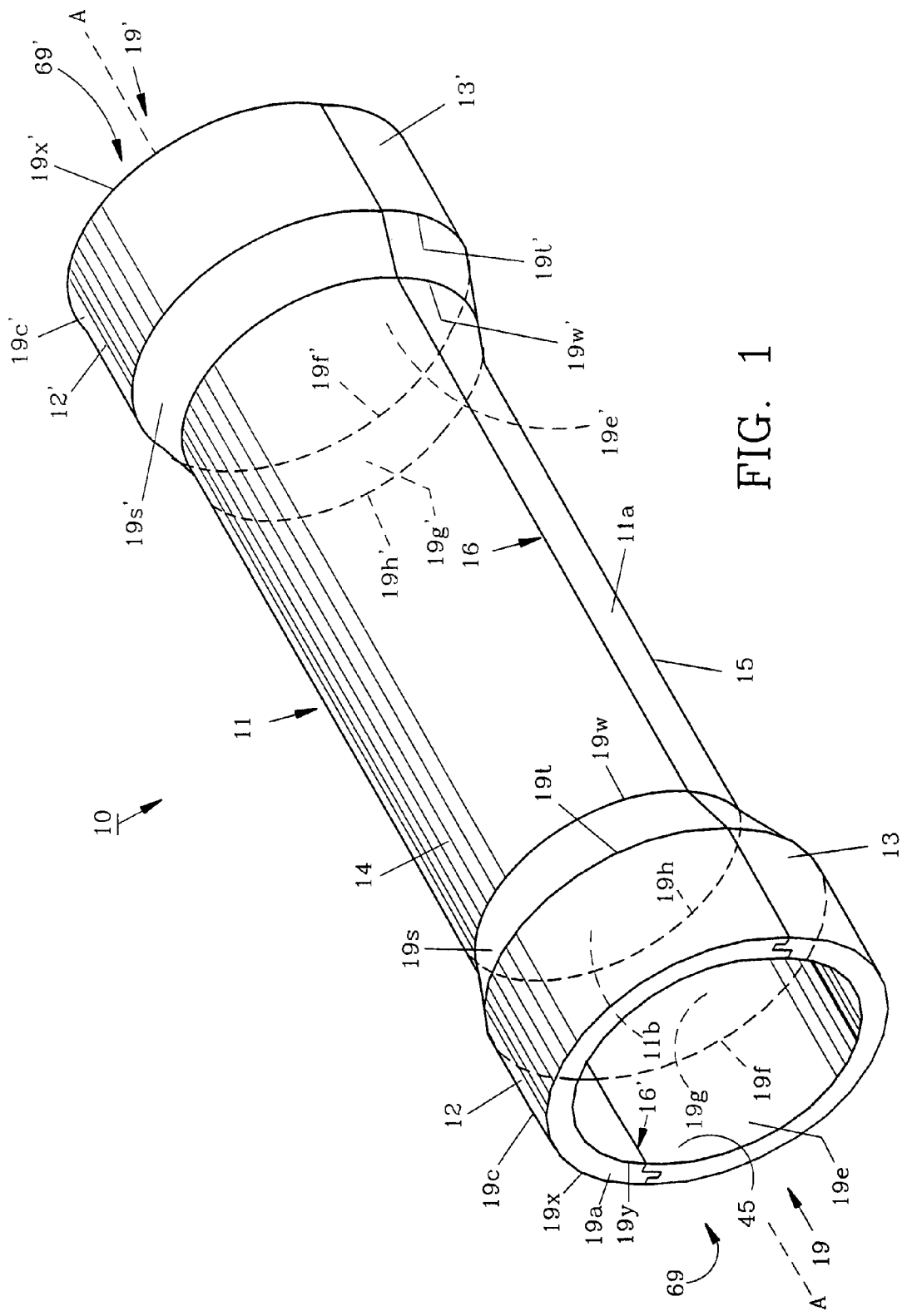
FIG. 1 shows an enlarged perspective view of the repair apparatus in linear form before placing it on a damaged conduit.

For a better understanding of the invention and its method of operation, turning now to the drawings, FIG. 1 shows an enlarged perspective view of preferred repair apparatus 10 extending alone a longitudinal central axis A. Preferably, the apparatus is formed from PVC (polyvinyl chloride) shown with a linear configuration and having a semi-tubular upper section 14 and semi-tubular lower section 15 which form a tubular central portion 11 with flared ends 19, 19'. Repair apparatus 10 is connected along side joint 16, 16'.

With reference particularly to FIGS. 1 and 6, the flared ends 19, 19' include a pair of opposing planar end walls 19a, 19a' perpendicularly disposed with respect to the longitudinal central axis A and forming opposing marginal ends 69, 69' of the apparatus 10. Each of the opposing planar end walls 19a, 19a' includes a circular outer edge 19x, 19x', respectively, and a circular inner edge 19y, 19y' concentrically disposed within the circular outer edge 19x, 19x', respectively.

Preferably, the marginal outer surface 43 of the apparatus 10 takes a form including a pair of opposing cylindrical end walls 19c, 19c' each extending longitudinally from proximate one of the circular outer edges 19x, 19x' of the opposing planar end walls 19a, 19a' to a circular inner terminus 19t, 19t', respectively. A pair of opposing frustoconically-shaped intermediate walls 19s, 19s' each extend longitudinally from proximate one of the circular inner termini 19t, 19t' of the opposing cylindrical end walls 19c, 19c' to a circular inner terminus 19w, 19w', respectively. The cylindrical end walls 19c, 19c', together with the frustoconically-shaped intermediate walls 19s, 19s', form the flared ends 19, 191 of the apparatus 10. A cylindrical central wall 11a extends from proximate one of the circular inner termini 19w of the pair of opposing frustoconically-shaped intermediate walls 19s, 19s' to proximate the other inner termini 19w'.

With reference primarily to FIGS. 1, 4, 5 and 6, at the flared ends 19, 19' of the apparatus 10, the marginal inner surface 45 includes a pair of opposing cylindrical end walls 19e, 19e' each disposed concentrically within the pair of opposing cylindrical end walls 19c, 19c' of the marginal outer surface 43 of the apparatus 10. Each of the walls 19e, 19e' extends from proximate one of the circular inner edges 19y, 19y' of the pair of opposing planar end walls 19a, 19a' to a circular inner terminus 19f, 19f'. A pair of opposing inner frustoconically-shaped intermediate walls 19g, 19g' are each disposed in concentric relation within one of the frustoconically-shaped intermediate walls 19, 19s' of the marginal outer surface 43 of the apparatus 10. Each of the walls 19g, 19g' extends longitudinally from proximate one of the circular inner terminus 19f, 19f' of the cylindrical end walls 19e, 19e' to a circular inner terminus 19h, 19h', respectively. In the tubular central portion 11 of the apparatus 10, a cylindrical central wall 11b extends longitudinally from proximate one of the circular inner termini 19h, 19h' of the pair of opposing inner frustoconically-shaped intermediate walls 19f, 19f' to proximate the other disposed concentrically within the cylindrical central wall 11a of the marginal outer surface 43.

Figure 3:
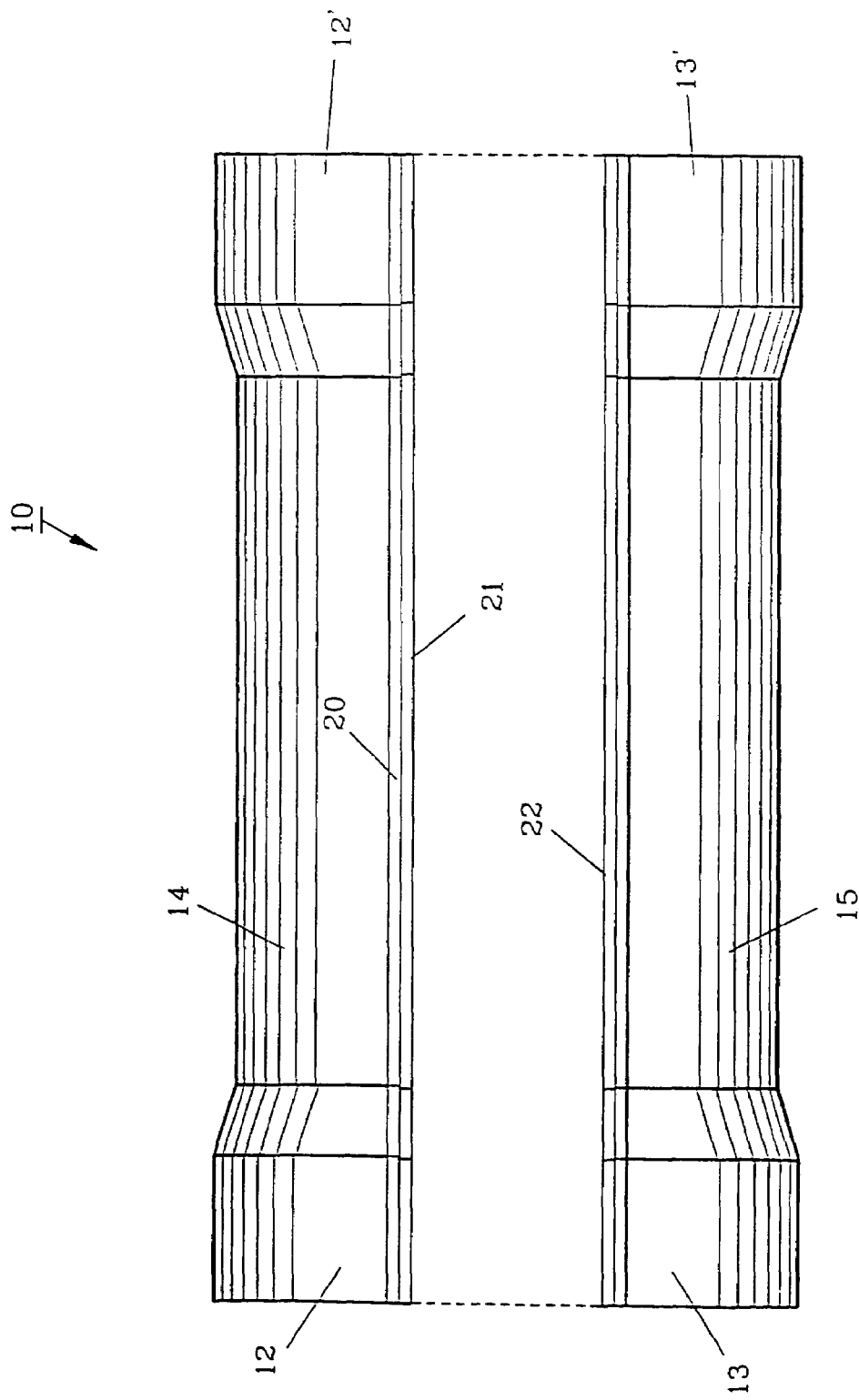
FIG. 3 demonstrates a side elevational view of the linear repair apparatus shown in FIG. 2 but with the upper section separated from the lower section to expose the edges thereof.
Figure 4B:
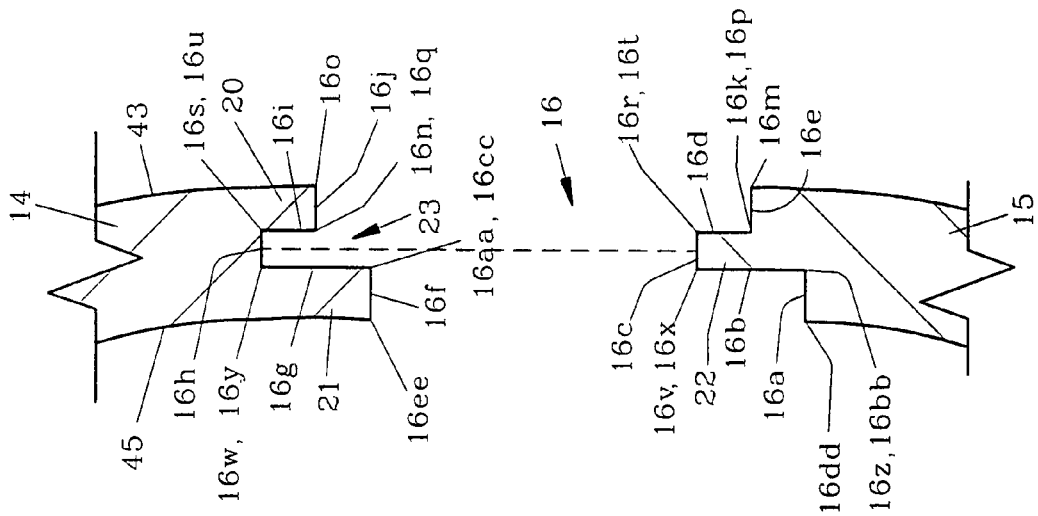
FIG. 4B is an enlarged end cross section of a joint at the right side of FIG. 4 with the upper and lower sections separated for clarity.
Figure 4A:
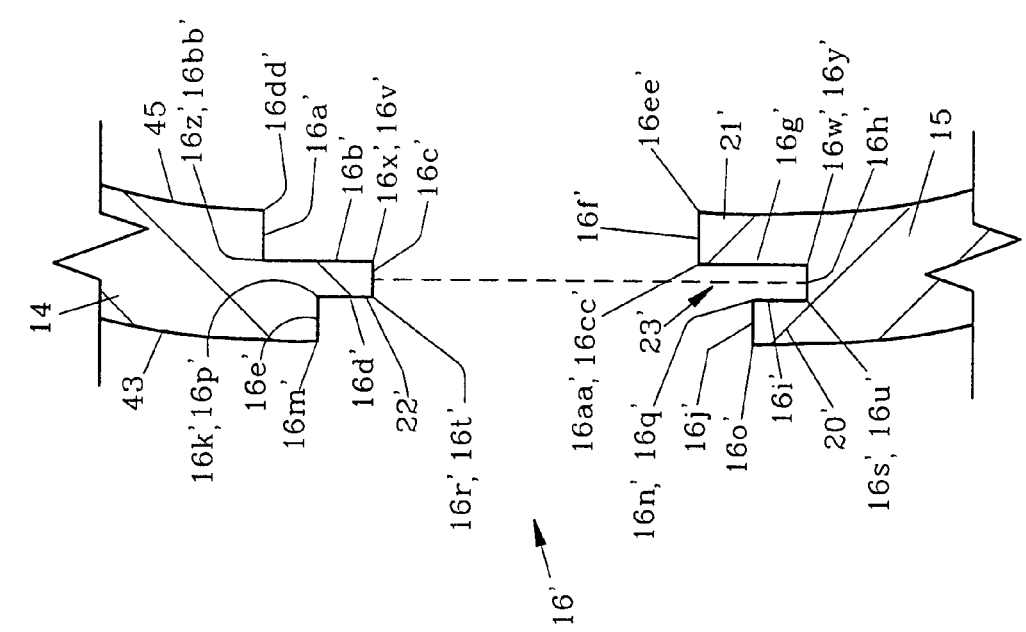
FIG. 4A demonstrates an enlarged view along lines 4A-4A of FIG. 4 with the upper and lower sections separated for clarity.

In FIG. 2 a side view of repair apparatus 10 is shown with flared ends 12, 12' as also seen in FIG. 3 with upper section 14 separated from lower section 15. Upper section 14 includes a relatively short exterior ridge 20 and a longer interior ridge 21 which mate with projection 22 of lower section 15 to form longitudinal joint 16 on the right side of repair apparatus 10 as seen in FIGS. 3 and 4. In FIG. 4, side joint 16' is formed opposite side joint 16 whereby short exterior ridge 20' and longer interior ridge 21' on lower section 15 engage projection 22' on upper section 14 along the left side to form joint 16'. FIGS. 4 and 5 demonstrate cross-sectional views whereas FIG. 6 demonstrates an end view of repair apparatus 10. FIG. 4A shows an enlarged view as seen along lines 4A-4A of FIG. 4 in exploded fashion. FIG. 7 shows a bottom view of lower section 15 of repair apparatus 10. In FIG. 4A a fragmented view of side joint 161 is seen with semi-tubular lower section 15 which includes short exterior ridge 20', longer interior ridge 21' and depression 23' therebetween. As shown in FIG. 1, side joint 16 is oppositely constructed to provide identical upper 14 and lower 15 sections.

With reference primarily to FIGS. 3, 4, 4A, 4B, 5 and 6, the short exterior ridges 20, 20', longer interior ridges 21, 21' and depressions 23, 231 therebetween form side joints 16, 16' including a series of walls between the marginal inner 45 and outer 43 surfaces of the apparatus 10. More particularly, the side joints 16, 16' include two pairs of abutting, parallel planar walls 16e, 16j and 16e', 16j'. Each wall 16e, 16j, 16e', 16j' extends longitudinally from one of the opposing planar end walls 19a, 19a' of the apparatus 10 to the other and radially with respect to the longitudinal central axis A from an inner edge 16k, 16n, 16k', 16n' to an outer edge 16m, 16o, 16m', 16o', respectively, contiguous with the marginal outer surface 43 of the apparatus 10. These two pairs of planar walls 16e, 16j and 16e', 16j' are diametrically opposed with respect to the longitudinal central axis A of the apparatus 10.

The side joints 16, 16' further include a pair of abutting, parallel planar walls 16d, 16i and 16d', 16i', also extending from one of the pair of opposing planar end walls 19a, 19a' to the other, and disposed in perpendicular relation to the walls 16e, 16j, 16e', 16j'. Each of the walls 16d, 16i, 16d', 16i' includes one edge 16p, 16q, 16p', 16q' contiguous with the longitudinal inner edge 16k, 16n, 16k', 16n' of one of the walls 16e, 16j, 16e', 16j' and a distally related longitudinal opposing edge 16r, 16s, 16r', 16s', respectively.

Another two pairs of abutting, parallel planar walls 16c, 16h and 16c', 16h' also extend longitudinally from one of the pair of opposing planar end walls 19a, 19a' to the other disposed in parallel relation to the walls 16e, 16j, 16e', 16j' and perpendicular relation to the walls 16d, 16i, 16d', 16i'. The walls 16c, 16h, 16c', 16h' each have an outer edge 16t, 16u, 16t', 16u' contiguous with one of the longitudinal edges 16r, 16s, 16r', 16s' and an opposing longitudinal inner edge 16v, 16w, 16v', 16w'.

A fourth two pairs of abutting, parallel planar walls 16b, 16g and 16b', 16g' also extend longitudinally from one of the opposing planar end walls 19a, 19a' to the other. Each wall has a longitudinal edge 16x, 16y, 16x', 16y' contiguous with the longitudinal inner edge 16v, 16w, 16v', 16w' and an opposing, distally related longitudinal edge 16z, 16aa, 16z', 16aa'. Preferably, the walls 16b, 16g, 16b', 16g' are significantly longer than the walls 16d, 16i, 16d', 16i'.

Finally, the side joints 16, 16' include two pairs of abutting, parallel planar walls 16a, 16f, 16a', 16f' each extending from an edge 16dd, 16ee, 16dd', 16ee' contiguous with the marginal inner surface 45 of the apparatus 10 to an edge 16bb, 16cc, 16bb', 16cc' contiguous with one of the longitudinal edges 16z, 16aa, 16z', 16aa' of each wall of the fourth pair.

Figure 14:
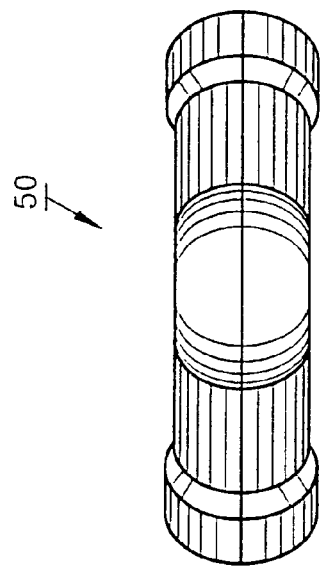
FIG. 14 shows another view of the embodiment shown in FIG. 12 along lines 14-14.
Figure 13:
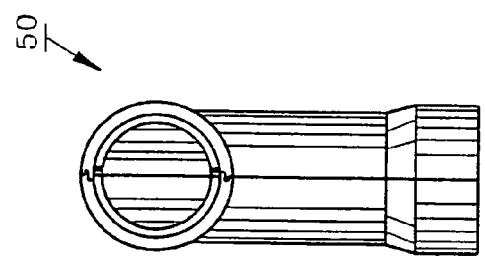
FIG. 13 illustrates another view of the embodiment shown in FIG. 12 along lines 13-13.
Figure 12:
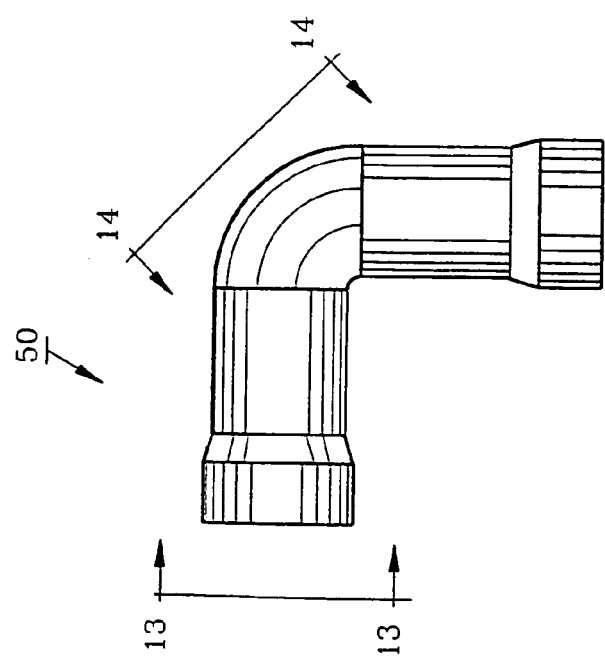
FIG. 12 shows another embodiment of the repair apparatus in a 90° configuration.
Figure 17:
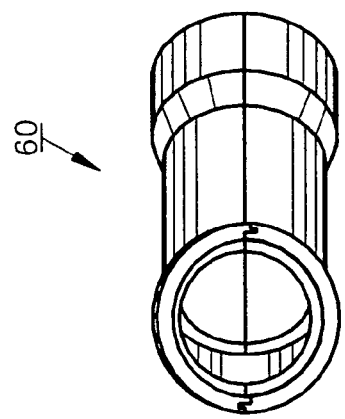
FIG. 17 shows the embodiment seen in FIG. 15 along lines 17-17.
Figure 16:
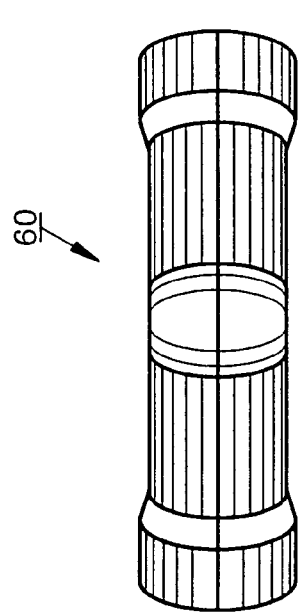
FIG. 16 illustrates the embodiment shown in FIG. 15 along lines 17-17.
Figure 15:
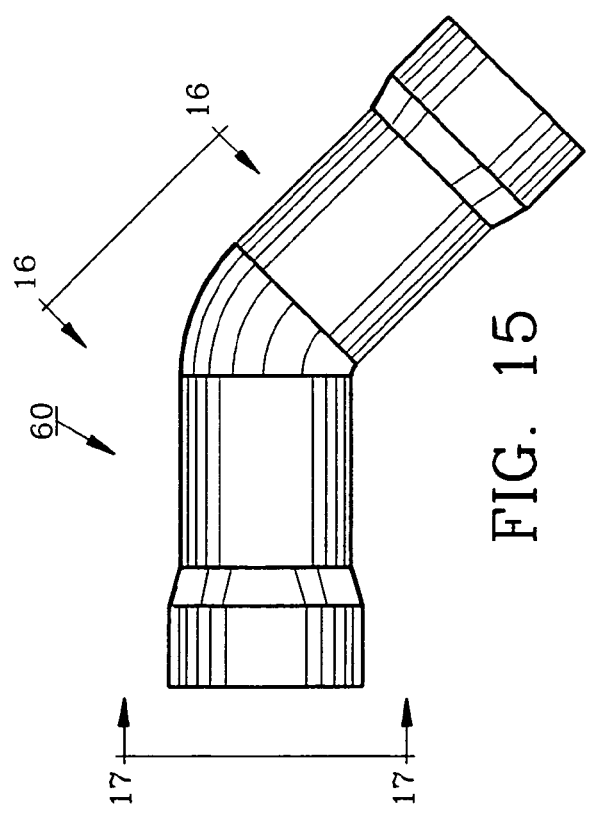
FIG. 15 illustrates another embodiment of the repair apparatus of the invention in a 45° configuration.

FIGS. 12-14 feature various views of a first angular embodiment of the invention, namely repair apparatus 50 which is formed at a 90° angle to accommodate sharp turns in a conduit as may be found in the field. In another embodiment, repair apparatus 60 is shown in FIGS. 15-17, and is likewise angular in shape, having a 45° form. As would be understood angular embodiment 50 and angular embodiment 60 utilize the same side joint configurations with ridges and joints as that of preferred linear repair apparatus 10.

Angular configurations 50 and 60 while shown and useful in certain circumstances are not preferred embodiments. It should also be understood that many configurations of this repair apparatus could be made, such as angular configurations of 30°, 60° or others, depending on the desires and uses of the manufacture.

In the description of the preferred method of repairing a damaged conduit, linear conduit 10 is used herein although the same steps would be substantially carried out whether the conduit to be repaired is linear or angular. In FIG. 8, a typical below ground conduit installation is seen with PVC conduit 30 buried below earth 31. Electrical wires 32, 33 are generally contained and protected within conduit 30. As further seen in FIG. 8, conduit 30 has been damaged as evidenced by cracks 34 therein, which may have resulted from heavy vehicles rolling thereover or the like. Cracks 34 will allow moisture to enter conduit 30 and may cause an electrical shortage or failure.

Figure 10:
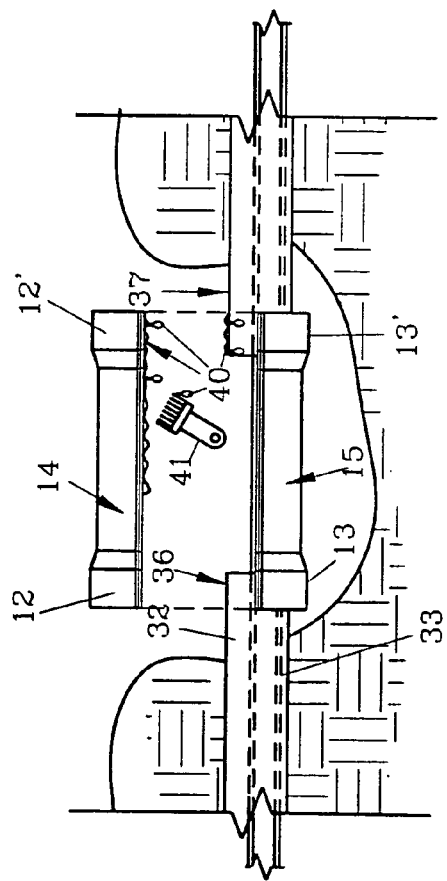
FIG. 10 illustrates the conduit as shown in FIG. 9 with a lower section of repair apparatus joined thereto.
Figure 11:
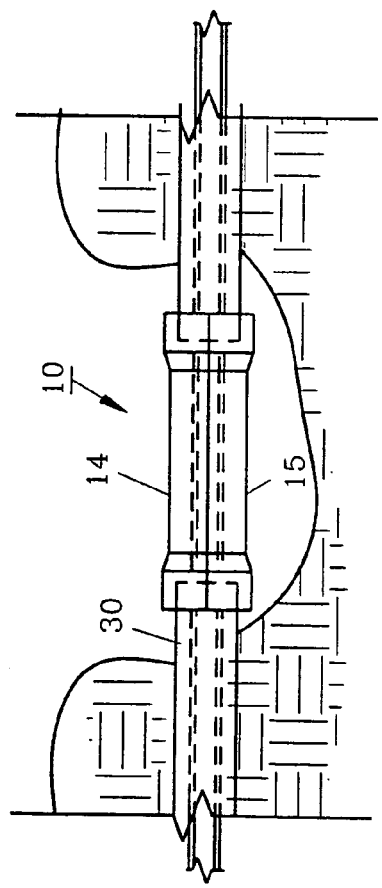
FIG. 11 demonstrates the conduit as seen in FIG. 10 but with the upper section of the repair apparatus placed thereon to seal the conduit.

The preferred method employed is described as follows: Conduit 30 is first exposed by moving a portion of earth 31 as shown in FIG. 9 to isolate conduit 30. The damaged length of conduit 30 is then removed by hand sawing conduit 30 (not seen) to leave electrical wires 32, 33 exposed and in place in then discontinuous conduit 30. Electrical wires 32, 33 are then repaired if necessary. Next, the section of conduit 30 to be removed is measured to approximate the length of central portion 11 of linear repair apparatus 10 (FIG. 1). Next, semi-tubular lower section 15 of repair apparatus 10 is coated with adhesive 40 along the side edges and flared ends 13, 13' and is placed on spaced apart ends 36, 37 of conduit 30 beneath electrical wires 32, 33 as shown in FIG. 10 and is held in place. Next, the upper section 14 likewise has adhesive 40 applied such as with brush 41 to the inside of flared ends 12, 12' and along the longitudinal edges as shown in FIG. 10. Once the adhesive has been applied, upper section 14 is then manually placed into engagement with lower section 15 as illustrated in FIG. 11. Adhesive 40 is preferably of the fast drying type, and earth can then be replaced around and on top of repair apparatus 10 and exposed conduit ends 36, 37 whereby electrical wires 32, 33 therein will once again be in a safe, water-proof environment. As would be understood, the adhesive and material types selected would be compatible for the particular conduit repaired and the composition of the particular repair apparatus used.

The illustrations and examples provided herein are for explanatory purposes and are not intended to limit the scope of the appended claims.

I claim:

1. A pair of identical semi-tubular conduit halves connectable to form a tubular conduit comprising:
   a pair of opposing planar end walls perpendicularly disposed with respect to the longitudinal central conduit axis and forming opposing marginal ends of the conduit, each of said pair of opposing planar end walls comprising a circular outer edge and a circular inner edge concentrically disposed within said circular outer edge;
   a marginal outer surface of the conduit comprising:
      a pair of opposing cylindrical end walls each extending longitudinally from proximate one of said circular outer edges of said pair of opposing planar end walls to a circular inner terminus;
      a pair of opposing frustoconically-shaped intermediate walls each extending longitudinally from proximate one of said circular inner termini of said pair of opposing cylindrical end walls to a circular inner terminus;
      a cylindrical central wall extending from proximate one of said circular inner termini of said pair of opposing frustoconically-shaped intermediate walls to proximate the other of said circular inner termini of said pair of frustoconically-shaped intermediate walls;
   a marginal inner surface of the conduit comprising:
      a pair of opposing cylindrical end walls each concentrically disposed within one of said pair of opposing cylindrical end walls of said marginal outer surface and extending longitudinally from proximate one of said circular inner edges of said pair of opposing planar end walls to a circular inner terminus;
      a pair of opposing frustoconically-shaped intermediate walls each disposed concentrically within one of said pair of frustoconically-shaped intermediate walls of said marginal outer surface and extending longitudinally from proximate one of said circular inner termini of said pair of opposing cylindrical end walls of said marginal inner surface to a circular inner terminus; and
      a cylindrical central wall extending longitudinally from proximate one of said circular inner termini of said pair of opposing frustoconically-shaped intermediate walls of said marginal inner surface to proximate the other of said pair and disposed concentrically within said cylindrical central wall of said marginal outer surface;
   a first two pairs of planar walls, one pair of said first two pairs diametrically opposed to the other pair of said first two with respect to said longitudinal central axis, one wall of each of said first two pairs abutting in parallel relation the other wall of the pair, each wall of said first two pairs extending longitudinally from one of the pair of opposing planar end walls to the other and radially with respect to said longitudinal central axis from an outer edge contiguous with said marginal outer surface of the conduit to a longitudinal inner edge;
   a second two pairs of planar walls, one wall of each pair abutting in parallel relation the other wall of the pair, each wall of said second two pairs extending longitudinally from one of said pair of opposing planar end walls to the other disposed in perpendicular relation to said first two pairs and comprising one edge contiguous with said longitudinal inner edge of one wall of each of said first two pairs of planar walls and a longitudinal opposing edge distally related to said one edge;
   a third two pairs of planar walls, one wall of each pair abutting in parallel relation the other wall of the pair, each wall of said third two pairs extending longitudinally from one of the pair of opposing planar end walls to the other disposed in perpendicular relation to said second two pairs of planar walls, each wall of said third two pairs of planar walls comprising an outer edge contiguous with said longitudinal opposing edge of one wall of each of said second two pairs of planar walls and a longitudinal inner edge;
   a fourth two pairs of planar walls, one wall of each of pair abutting in parallel relation the other wall of the pair, each wall of said fourth two pairs extending longitudinally from one of said pair of opposing planar end walls to the other disposed in perpendicular relation to said third two pairs of parallel planar walls and comprising a longitudinal edge contiguous with one of said longitudinal inner edges of said third two pairs of parallel planar walls and an opposing edge distally related to said longitudinal edge; and a fifth two pairs of planar walls, one wall of each pair abutting in parallel relation the other wall of the pair, each wall of said fifth two pairs extending longitudinally from one of said pair of opposing planar end walls to the other disposed in perpendicular relation to said fourth two pairs of parallel planar walls and comprising a longitudinal outer edge contiguous with one of said opposing edges of said fourth two pairs of planar walls and an opposing distally related edge contiguous with said marginal inner surface.

2. The pair of semi-tubular conduit halves according to claim 1 wherein the fourth two pairs of planar walls are each longer between opposing longitudinal edges than any of the third two pairs.

* * * * *

Disclaimer

7,416,227—William C. Earnest, Fayetteville, NC (US). CONDUIT REPAIR APPARATUS AND METHOD. Patent Dated Aug. 26, 2008. Disclaimer filed June 17, 2010 by Inventor.
  Hereby disclaims claim 1 of said patent.

*(Official Gazette, July 20, 2010)*